2,934,560

CYCLIC ALCOHOLS AND ESTERS AND PREPARATION THEREOF

Walter Kimel, Highland Park, N.J., assignor to Hoffmann-La Roche Inc., Nutley, N.J., a corporation of New Jersey No Drawing. Application March 5, 1958
Serial No. 719,454

17 Claims. (Cl. 260—488)

This invention relates to novel chemical compounds and to novel methods of making the same. More particularly, the invention relates to novel chemical compounds, having odorant properties, which compounds can be characterized broadly as: 4-[2-methyl-5-(secondary acyclic hydrocarbyl)-1-cyclopenten-1-yl (and -cyclopentan-1-yl)]-2-butanols; nuclear lower hydrocarbyl-substituted analogs thereof; and certain esters of all of the foregoing alcohols. The invention relates further to methods of preparing said alcohols from 4-[2-methyl-5-(secondary acyclic hydrocarbyl)-1-cyclopenten-1-yl (and -cyclopentan-1-yl)]-2-butanones and analogs; and to methods of preparing said esters from said alcohols.

The novel compounds of the invention are more precisely defined by the following general formula:

(I)
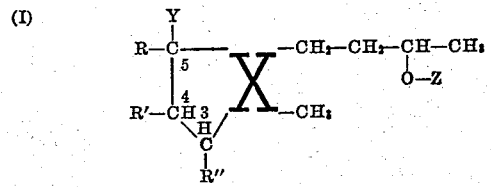

wherein:
The symbol X represents a tetravalent radical selected from the group consisting of the radical =CH—CH= and the radical =C=C=; the symbol Y represents a member selected from the group consisting of lower alkyl radicals and lower alkenyl radicals each containing at least three carbon atoms and attached through the 2-carbon atom thereof; the symbol Z represents a member selected from the group consisting of hydrogen and hydrocarbyl-carbonyl radicals which contain in the hydrocarbyl portion thereof not more than seven carbon atoms; and each of the symbols R, R' and R" represents a member selected from the group consisting of hydrogen and lower acyclic hydrocarbon radicals; it being understood that the three symbols R, R' and R" can, but need not, be identical.

In the above Formula I, illustrative meanings of the symbol Y include: methyl, ethyl, isobutyl, tert. butyl, ethylidene, isobutylidene, n-pentylidene and the like. Illustrative meanings of the symbol Z include: hydrogen; lower alkanoyl, such as formyl, acetyl, propionyl, isobutyryl, caproyl; cycloaliphatic acyl, such as cyclohexylcarbonyl, cyclohexylacetyl; aroyl, e.g. benzoyl, p-toluoyl, o-toluoyl; and the like. Illustrative meanings of the symbols R, R' and R" include: hydrogen; lower alkyl, such as methyl, ethyl, isopropyl; lower alkenyl, such as allyl; lower alkinyl, such as propargyl; and the like; it being further understood that the three symbols R, R' and R" can, but need not necessarily, represent identical meanings.

Starting materials for the invention, referred to above, are in general known compounds. They are disclosed, for instance, in U.S. Patent No. 2,799,706, and in U.S. Patent No. 2,849,490. By way of example, suitable starting materials include:

4-(2-methyl-5-isopropenyl-1-cyclopenten-1-yl)-2-butanone;

4-(2,5-dimethyl-5-isopropenyl-1-cyclopenten-1-yl)-2-butanone;

4-[2-methyl-5-(2-buten-2-yl)-1-cyclopenten-1-yl]-2-butanone;

4-[2-methyl-5-(4-methyl-2-penten-2-yl)-1-cyclopenten-1-yl]-2-butanone;

4-(2-methyl-3-ethyl-5-isopropenyl-1-cyclopenten-1-yl)-2-butanone;

4-(2-methyl-3-allyl-5-isopropenyl-1-cyclopenten-1-yl)-2-butanone;

4-(2-methyl-3-propargyl-5-isopropenyl-1-cyclopenten-1-yl)-2-butanone;

4-[2-methyl-3-ethyl-5-(2-buten-2-yl)-1-cyclopenten-1-yl]-2-butanone;

4-[2-methyl-3-allyl-5-(2-buten-2-yl)-1-cyclopenten-1-yl]-2-butanone;

4-(2-methyl-5-isopropyl-1-cyclopenten-1-yl)-2-butanone;

4-(2,5-dimethyl-5-isopropyl-1-cyclopenten-1-yl)-2-butanone;

4-(2-methyl-5-sec.-butyl-1-cyclopenten-1-yl)-2-butanone;

4-(2-methyl-3-ethyl-5-isopropyl-1-cyclopenten-1-yl)-2-butanone;

4-(2-methyl-3-propyl-5-isopropyl-1-cyclopenten-1-yl)-2-butanone;

4-(2-methyl-5-isopropyl-1-cyclopentyl)-2-butanone;

4-(2,5-dimethyl-5-isopropyl-1-cyclopentyl)-2-butanone;

4-(2-methyl-5-sec.-butyl-1-cyclopentyl)-2-butanone;

4-(2-methyl-3-ethyl-5-isopropyl-1-cyclopentyl)-2-butanone;

4-(2-methyl-3-propyl-5-isopropyl-1-cyclopentyl)-2-butanone; and 4-(2-methyl-3-propyl-5-sec.-butyl-1-cyclopentyl)-2-butanone.

The invention provides two general methods of making compounds included within the above Formula I. The first general method comprises reducing the starting material by the Meerwein-Ponndorf-Verley reaction: e.g. by heating the starting material with a mixture of an aluminum tri(lower alkoxide) and a lower alkanol. In practicing this method of the invention, it is preferred to use a mixture of aluminum tri(isopropoxide) and isopropanol as the reducing agent mixture. This first method of preparation results in the reduction of the oxo unsaturation only, leaving unchanged any side chain unsaturation and any nuclear unsaturation which may be present in the starting material.

A second general method of preparation provided by the invention comprises catalytically hydrogenating the starting material in the presence of a Raney nickel hydrogenation catalyst. When the hydrogenation is conducted under mild reaction conditions, i.e. at room temperature and under substantially atmospheric or only slightly superatmospheric hydrogenation pressures, only the oxo unsaturation, and the side chain unsaturation (when present), in the starting material is reduced. When the hydrogenation is conducted under more severe reaction conditions, e.g. at a reaction temperature of about 125° C. and under a hydrogen pressure of about 500 p.s.i. gauge, all unsaturation in the starting material—i.e. in the oxo group, in the side chain (when unsaturation is present) and in the nucleus (when unsaturation is present)—is reduced.

It will be understood from the foregoing that when a starting material of the class 4-[2-methyl-5-(2-lower alken-2-yl)-1-cyclopenten-1-yl]-2-butanone is reduced by means of a mixture of a lower alkanol and an aluminum tri(lower alkoxide), the product is a 4-[2-methyl-5-(2-lower-alken-2-yl)-1-cyclopenten-1-yl]-2-butanol. When a starting material of the class 4-[2-methyl-5-(2-lower alkyl)-1-cyclopenten-1-yl]-2-butanone is reduced by means of a mixture of a lower alkanol and an aluminum tri(lower alkoxide), the product is a 4-[2-methyl-5-(2-lower alkyl)-1-cyclopenten-1-yl]-2-butanol. When a starting material of the class 4-[2-methyl-5-(2-lower alkyl)-1-cyclopentyl]-2-butanone is reduced by means of a mixture of a lower alkanol and an aluminum tri(lower alkoxide), the product is a 4-[2-methyl-5-(2-lower alkyl)-1-cyclopentyl]-2-butanol.

Similarly, it will be understood that when a starting material either of the class 4-[2-methyl-5-(2-lower alken-2-yl)-1-cyclopenten-1-yl]-2-butanone or of the class 4-[2-methyl-5-(2-lower alkyl)-1-cyclopenten-1-yl]-2-butanone is reduced by catalytic hydrogenation in the presence of Raney nickel under mild reaction conditions, for example at room temperature and at a very slight superatmospheric hydrogen pressure, the product is, in each instance, a 4-[2-methyl-5-(2-lower alkyl)-1-cyclopenten-1-yl]-2-butanol. When a starting material of the class 4-[2-methyl-5-(2-lower alkyl)-1-cyclopentyl]-2-butanone is reduced by catalytic hydrogenation in the presence of Raney nickel under mild reaction conditions, for example those stated in the preceding sentence, the product is a 4-[2-methyl-5-(2-lower alkyl)-1-cyclopentyl]-2-butanol. However, when reducing catalytically in the presence of a Raney nickel catalyst and employing severe reaction conditions, for example when catalytically hydrogenating in the presence of Raney nickel at 125° C. under a hydrogen pressure of 500 p.s.i. gauge, the product is a 4-[2-methyl-5-(2-lower alkyl)-1-cyclopentyl]-2-butanol, irrespective of whether the starting material is a 4-[2-methyl-5-(2-lower alken-2-yl)-1-cyclopenten-1-yl]-2-butanone or a 4-[2-methyl-5-(2-lower alkyl)-1-cyclopenten-1-yl]-2-butanone or a 4-[2-methyl-5-(2-lower alkyl)-1-cyclopentyl]-2-butanone.

One preferred embodiment of the invention relates to compounds defined by the following general formula:

(II)
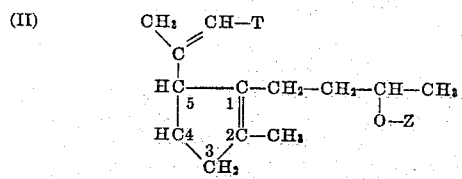

wherein the symbol T represents an alkyl radical having from one to four carbon atoms, and the symbol Z has the same meaning indicated above in connection with Formula I. Particularly preferred in this embodiment of the invention are the compounds generically identified as 4-[2-methyl-5-(2-lower alken-2-yl)-1-cyclopenten-1-yl]-2-butanol; especially 4-(2-methyl-5-isopropenyl-1-cyclopenten-1-yl)-2-butanol. Also preferred are esters of alcohols selected from the genus referred to in this paragraph with certain organic acids, said acids containing not more than eight carbon atoms and consisting only of carbon, hydrogen and oxygen atoms, the only oxygen atoms present being those contained in the carboxyl group of the acid. Particularly preferred in this category of esters are the compounds identified by the generic description 4-[2-methyl-5-(2-lower alken-2-yl)-1-cyclopenten-1-yl]-2-butyl lower alkanoate; especially 4-(2-methyl-5-isopropenyl-1-cyclopenten-1-yl)-2-butyl acetate.

Another preferred embodiment of the invention relates to compounds defined by the following general formula:

(III)
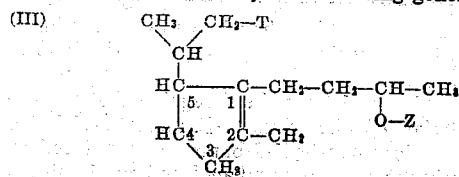

wherein the symbol T represents an alkyl radical having from one to four carbon atoms, and the symbol Z has the same meaning indicated above in connection with Formula I. Particularly preferred in this embodiment of the invention are the compounds generically identified as 4-[2-methyl-5-(2-lower alkyl)-1-cyclopenten-1-yl]-2-butanol; especially 4-(2-methyl-5-isopropyl-1-cyclopenten-1-yl)-2-butanol. Also preferred are esters of alcohols selected from the genus referred to in this paragraph with certain organic acids, said acids containing not more than eight carbon atoms and consisting only of carbon, hydrogen and oxygen atoms, the only oxygen atoms present being those contained in the carboxyl group of the acid. Particularly preferred in this category of esters are the compounds identified by the generic description 4-[2-methyl-5-(2-lower alkyl)-1-cyclopenten-1-yl]-2-butyl lower alkanoate; especially 4-(2-methyl-5-isopropyl-1-cyclopenten-1-yl)-2-butyl acetate.

Still another preferred embodiment of the invention relates to compounds defined by the following general formula:

(IV)
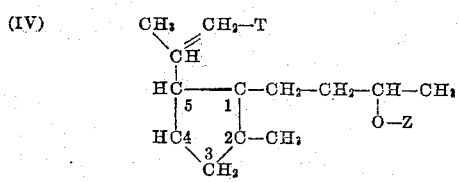

wherein the symbol T represents an alkyl radical having from one to four carbon atoms, and the symbol Z has the same meaning indicated above in connection with Formula I. Particularly preferred in this embodiment of the invention are the compounds generically identified as 4-[2-methyl-5-(2-lower alkyl)-1-cyclopentyl]-2-butanol; especially 4-(2-methyl-5-isopropyl-1-cyclopentyl)-2-butanol. Also preferred are esters of alcohols selected from the genus referred to in this paragraph with certain organic acids, said acids containing not more than eight carbon atoms and consisting only of carbon, hydrogen and oxygen atoms, the only oxygen atoms present being those contained in the carboxyl group of the acid. Particularly preferred in this category of esters are the compounds identified by the generic description 4-[2-methyl-5-(2-lower alkyl)-1-cyclopentyl]-2-butyl lower alkanoate; especially 4-(2-methyl-5-isopropyl-1-cyclopentyl)-2-butyl acetate.

The invention also provides a method of making the novel esters, previously described, which comprises esterifying a novel alcohol of the invention with an esterification agent appropriate to introduce an acyl radical having not more than eight carbon atoms and containing only carbon, hydrogen and oxygen atoms, oxygen being present only in the acylating function. Any of the esterification methods known per se can be employed, but it is usually preferred to react the alcohol with an acid chloride or acid anhydride (or mixture thereof) in the presence of a proton acceptor, e.g. a tertiary organic base.

The novel compounds of the invention described by Formula I above, including preferred embodiments of the invention described in connection with Formulas II, III and IV above, are useful as odor-imparting agents, e.g. in the preparation of perfumes, soaps, pharmaceutical compositions and scented compositions generally. The compounds of the invention are characterized generally as having odors of an ionone type, but with woody and earthy notes. Accordingly, they are especially useful in the preparation of perfumes of the character of cedarwood, sandalwood and patchouli.

The invention is further disclosed in the following examples, which are illustrative but not limitative thereof. Temperatures are stated in degrees centigrade (uncorrected).

Example 1

A mixture of 4-(2-methyl-5-isopropenyl-1-cyclopenten-1-yl)-2-butanone (192 g.), aluminum tri(isopropoxide) (143 g.) and isopropanol (1000 cc.) was heated to reflux in a flask connected to a fractionation column. Distillate was removed from the head, at a 3:1 reflux ratio, until the vapor temperature reached 82°. Then, the bulk of the excess isopropanol was removed in vacuo. The residue was allowed to cool, and was dissolved in a mixture of 245 cc. of concentrated HCl and 1225 cc. of water. The oil was extracted with toluene, and the organic layer was separated and washed neutral. The solvent was removed in vacuo, and the product was isolated by vacuum distillation. 4-(2-methyl-5-isopropenyl-1-cyclopenten-1-yl)-2-butanol was obtained at 78–81° (0.25 mm.); $n_D^{25}$ 1.4856.

Example 2

4-(2-methyl-5-isopropyl-1-cyclopenten-1-yl)-2-butanone (700 g.) was dissolved in methanol (1000 cc.) and was hydrogenated in the presence of Raney nickel (100 g.) at atmospheric temperature and pressure. Absorption of hydrogen was 0.98 mol equivalents (98% of theory). The catalyst was removed by filtration, and the product was isolated by distillation. 4-(2-methyl-5-isopropyl-1-cyclopenten-1-yl)-2-butanol was obtained at 69–71° (0.25 mm.); $n_D^{25}$ 1.4738.

Example 3

A solution of 4-(2-methyl-5-isopropyl-1-cyclopentyl)-2-butanone (506 g.) in methanol (500 cc.) was hydrogenated, in the presence of Raney nickel (100 g.), at atmospheric temperature and pressure, until there was no further absorption of hydrogen. After filtration of the catalyst, the product was purified by vacuum distillation. 4-(2-methyl-5-isopropyl-1-cyclopentyl)-2-butanol was obtained at 83–86° (0.8 mm.); $n_D^{25}$ 1.4581.

Example 4

In the same manner described in Example 1, a mixture of 4-(2,5-dimethyl-5-isopropenyl-1-cyclopenten-1-yl)-2-butanone (133.5 g.), aluminum tri(isopropoxide) (132.3 g.), and isopropanol (648 cc.) was heated to reflux. Acetone was removed from the head of the column until the vapor temperature reached 82°. Then excess isopropanol was rapidly removed in vacuo. The residue was cooled, and was dissolved in 500 cc. of 15% HCl solution. The product was extracted with petroleum ether, washed neutral, and dried with calcium sulfate. Vacuum distillation yielded, as the main product, 4-(2,5-dimethyl-5-isopropenyl-1-cyclopenten-1yl)-2-butanol of B.P. 88° (0.6 mm.); $n_D^{25}$ 1.4841.

Example 5

In the same manner described in Example 1, a mixture of 4-(2,5-dimethyl-5-isopropyl-1-cyclopenten-1-yl)-2-butanone (66.2 g.), aluminum tri(isopropoxide) (64.3 g.) and isopropanol (315 cc.) was heated until acetone was no longer observed in the distillate. The reaction mixture was worked up as described in Example 1, yielding 4-(2,5-dimethyl-5-isopropyl-1-cyclopentyl)-2-butanol of B.P. 85–86° (0.6 mm.) and $n_D^{25}$ 1.4729.

Example 6

A mixture of 4-(2-methyl-3-ethyl-5-isopropenyl-1-cyclopenten-1-yl)-2-butanone (84 g.), aluminum tri(isopropoxide) (78 g.) and isopropanol (382 cc.) was heated to complete elimination of acetone. On working up as in Example 1, there was obtained 4-(2-methyl-3-ethyl-5-isopropenyl-1-cyclopenten-1-yl)-2-butanol of B.P. 101–103° (0.075 mm.); $n_D^{25}$ 1.4841.

Example 7

By a procedure similar to that of Example 1, there was obtained from 4-(2-methyl-3-ethyl-5-isopropyl-1-cyclopentyl)-2-butanone (65.1 g.), aluminum tri(isopropoxide) (59.3 g.) and isopropanol (290 cc.), 4-(2-methyl-3-ethyl-5-isopropyl-1-cyclopentyl)-2-butanol; B.P. 104–106° (0.6 mm.); $n_D^{25}$ 1.4725.

Example 8

A mixture of 4-[2-methyl-5-(4-methyl-2-penten-2-yl)-1-cyclopenten-1-yl]-2-butanone (416.2 g.), aluminum tri(isopropoxide) (362.5 g.) and isopropanol (1775 cc.) was heated to boiling, and acetone produced during the reaction was eliminated by distillation. The mixture was worked up as described in Example 1, and 4-[2-methyl-5-(4-methyl-2-penten-2-yl)-1-cyclopenten-1-yl]-2-butanol was obtained; B.P. 109–110° (0.25 mm.); $n_D^{25}$ 1.4818.

Example 9

In the manner described in Example 1, 4-[2-methyl-5-(4-methyl-2-pentyl)-1-cyclopentyl]-2-butanone (64.6 g.) was treated with aluminum tri(isopropoxide) (55.4 g.) and isopropanol (272 cc.) to produce 4-[2-methyl-5-(4-methyl-2-pentyl)-1-cyclopentyl]-2-butanol (56.3 g.); B.P. 110–111° (0.6 mm); $n_D^{25}$ 1.4725.

The starting material for this example; i.e. 4-[2-methyl-5-(4-methyl-2-pentyl)-1-cyclopentyl]-2-butanone, B.P. 95–96° (0.4 mm.), $n_D^{25}$ 1.4680; was made from 4-[2-methyl-5-(4-methyl-2-penten-2-yl)-1-cyclopenten-1-yl]-2-butanone, disclosed in Example 4 of above identified Patent No. 2,799,706, by catalytic hydrogenation at 125° C. and under 500 p.s.i. gauge hydrogen pressure in the presence of 5% Pd–CaCO₃ catalyst, according to the process described in above identified U.S. Patent No. 2,849,490.

Example 10

To a mixture of 4-(2-methyl-5-isopropenyl-1-cyclopenten-1-yl)-2-butanol (50 g.) and dimethylaniline (110 cc.) was added, at room temperature, a mixture of acetyl chloride (44 cc.) and acetic anhydride (27 cc.). Then, the reaction mixture was warmed to 40° for one hour, and allowed to stand at room temperature for two days. Finally, the reaction mixture was poured onto ice and water. The oil was separated, and was washed with dilute acid, with aqueous sodium bicarbonate solution, and then with water until neutral. The product, 4-(2-methyl-5-isopropenyl-1-cyclopenten-1-yl)-2-butyl acetate, was purified by distillation in vacuo, B.P. 93–96° (1.5 mm.); $n_D^{25}$ 1.4675.

Example 11

4-(2,5-dimethyl-5-isopropenyl-1-cyclopenten-1-yl)-2-butanol (59.7 g.) was added to a mixture of acetic anhydride (32.8 g.) and pyridine (64 cc.). The solution was heated to 80° for six hours, and then was allowed to stand overnight at room temperature. In the morning, it was poured cautiously onto 575 cc. of warm water. The oil was separated, and was washed to neutrality with dilute acid, sodium bicarbonate solution, and water. Vacuum distillation afforded 58.3 g. of 4-(2,5-dimethyl-5-isopropenyl-1-cyclopenten-1-yl)-2-butyl acetate, B.P. 91° (0.8 mm.); $n_D^{25}$ 1.4671.

Example 12

In the manner described in Example 11, 4-(2,5-dimethyl-5-isopropyl-1-cyclopentyl)-2-butanol (34.2 g.) was treated with acetic anhydride (18.4 g.) and pyridine 36 cc.) for six hours at 80°. By working up as described in Example 11, there was obtained 4-(2,5-dimethyl-5-isopropyl-1-cyclopentyl)-2-butyl acetate (35.6 g.); B.P. 104–105° (2 mm.); $n_D^{25}$ 1.4580.

Example 13

4-[2-methyl-5-(4-methyl-2-penten-2-yl)-1-cyclopenten-1-yl]-2-butanol (229.9 g.) was added to formic acid (269 g.), and the mixture was heated to 80–85° for three hours. It was allowed to stand overnight at room temperature, and then it was poured onto 1950 cc. of water.

The mixture was extracted with ether, and the ether layer was washed neutral, dried with calcium sulfate and distilled. 4-[2-methyl-5-(4-methyl-2-penten-2-yl)-1-cyclopenten-1-yl]-2-butyl formate was obtained at 106–107° (0.8 mm.); $n_D^{25}$ 1.4707.

*Example 14*

A mixture of 4-[2-methyl-5-(4-methyl-2-pentyl)-1-cyclopentyl]-2-butanol (40.4 g.) and formic acid (46.5 g.) was heated to 80–85° for three hours. The reaction mixture was worked up in the manner described in Example 13, yielding 4-[2-methyl-5-(4-methyl-2-pentyl)-1-cyclopentyl]-2-butyl formate; B.P. 103–105° (0.5 mm.); $n_D^{25}$ 1.4607.

*Example 15*

4 - (2 - methyl - 3-ethyl-5-isopropenyl-1-cyclopenten-1-yl)-2-butanol (45.4 g.) was added to a solution of isobutyric anhydride (39 g.) in pyridine (49 cc.), and the mixture was heated to 80° for three hours. Then it was allowed to cool, and was poured onto 500 cc. of warm water. The product was extracted with ether, washed with dilute sulfuric acid, saturated sodium bicarbonate, and water until neutral. It was then dried with calcium sulfate and distilled. 4-(2-methyl-3-ethyl-5-isopropenyl-1-cyclopenten-1-yl)-2-butyl isobutyrate was obtained at 118° (0.4 mm.); $n_D^{25}$ 1.4649.

*Example 16*

A mixture of 4-(2-methyl-3-ethyl-5-isopropyl-1-cyclopentyl)-2-butanol (43.9 g., isobutyric anhydride (34.5 g.) and pyridine (43.5 cc.) was heated to 80° for six hours. Then, it was worked up in the manner described in Example 15, yielding 4-(2-methyl-3-ethyl-5-isopropyl-1-cyclopentyl)2-butyl isobutyrate; B.P. 112–115° (0.4 mm.); $n_D^{25}$ 1.4555.

*Example 17*

To a solution of 4-(2-methyl-5-isopropenyl-1-cyclopenten-1-yl)-2-butanol (40.4 g.) in pyridine (18.1 g.) was added, dropwise, with stirring, benzoyl chloride (29.3 g.). An exothermic reaction ensued, causing a temperature rise to 84°. Then, heating was continued for two hours at 100°. The mixture was cooled to room temperature and was poured onto 1500 cc. of cold water. The oil was extracted with ether, and the ether layer was washed with saturated sodium bicarbonate solution and then with water until neutral. Finally, the ether solution was dried with anhydrous calcium sulfate and distilled. The product, 4 - (2 - methyl - 5-isopropenyl-1-cyclopenten-1-yl)-2-butyl benzoate, was collected as a liquid at B.P. 132–133° (0.3 mm.); $n_D^{25}$ 1.5171.

I claim:

1. A compound having the general formula

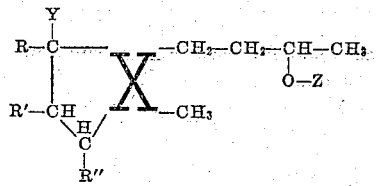

wherein the symbol X represents a tetravalent radical selected from the group consisting of the =CH—CH= radical and the =C=C= radical; the symbol Y represents a radical selected from the group consisting of lower alkyl radicals and lower alkenyl radicals each containing at least three carbon atoms and connected through the 2-carbon atom thereof; the symbol Z represents a member selected from the group consisting of hydrogen and hydrocarbylcarbonyl radicals which contain not more than seven carbon atoms in the hydrocarbyl portion thereof; and each of the symbols R, R' and R" represents a member selected from the group consisting of hydrogen and lower acyclic hydrocarbon radicals.

2. 4-[2-methyl-5-(2-lower alken-2-yl)-1-cyclopenten-1-yl]-2-butanol.

3. An ester of an alcohol according to claim 2 with an acid containing only carbon, hydrogen and oxygen atoms, the oxygen being only in the carboxy group of the acid and the acid containing not more than eight carbon atoms.

4. 4-[2-methyl-5-(2-lower alken-2-yl)-1-cyclopenten-1-yl]-2-butyl lower alkanoate.

5. 4[2-methyl-5-(2-lower alkyl)-1-cyclopenten-1-yl]-2-butanol.

6. An ester of an alcohol according to claim 5 with an acid containing only carbon, hydrogen and oxygen atoms, the oxygen being only in the carboxy group of the acid and the acid containing not more than eight carbon atoms.

7. 4-[2-methyl-5-(2-lower alkyl)-1-cyclopenten-1-yl]-2-butyl lower alkanoate.

8. 4 - [2 - methyl-5-(2-lower alkyl)-1-cyclopentyl]-2-butanol.

9. An ester of an alcohol according to claim 8 with an acid containing only carbon, hydrogen and oxygen atoms, the oxygen being only in the carboxy group of the acid and the acid containing not more than eight carbon atoms.

10. 4-[2-methyl-5-(2-lower alkyl)-1-cyclopentyl]-2-butyl lower alkanoate.

11. 4-(2-methyl-5-isopropenyl-1-cyclopenten-1-yl)-2-butanol.

12. 4 - (2-methyl-5-isopropyl-1-cyclopenten-1-yl)-2-butanol.

13. 4 - (2-methyl-5-isopropyl-1-cyclopentyl)-2-butanol.

14. 4 - (2,5 - dimethyl - 5 - isopropyl - 1 - cyclopentyl)-2-butanol.

15. 4 - (2 - methyl-5-isopropenyl-1-cyclopenten-1-yl)-2-butyl acetate.

16. A process which comprises reacting a ketone selected from the group consisting of 4-[2-methyl-5-(2-lower alken-2-yl)-1-cyclopenten-1-yl]-2-butanone, 4-[2-methyl-5-(2-lower alkyl)-1-cyclopenten-1-yl]-2-butanone and 4-[2-methyl-5-(2-lower alkyl)-1-cyclopentyl]-2-butanone with a mixture of lower alkanol and aluminum tri(lower alkoxide).

17. A process which comprises subjecting to catalytic hydrogenation in the presence of a Raney nickel catalyst a ketone selected from the group consisting of 4-[2-methyl-5-(2-lower alken-2-yl)-1-cyclopenten-1-yl]-2-butanone, 4-[2-methyl-5-(2-lower alkyl)-1-cyclopenten-1-yl]-2-butanone, and 4-[2-methyl-5-(2-lower alkyl)-1-cyclopentyl]-2-butanone.

References Cited in the file of this patent

UNITED STATES PATENTS

| | | |
|---|---|---|
| 2,447,050 | Bludworth et al. | Aug. 17, 1948 |
| 2,556,150 | Wearn et al. | June 5, 1951 |
| 2,597,842 | Linn | May 27, 1952 |
| 2,597,843 | Linn | May 27, 1952 |

OTHER REFERENCES

Muhlendyk, Chem. Abs. 8, 3184 (1914).
Urion, Compt. rend. 194, 2311–3 (1932).
Beilstein, Handbuch der Organischen Chemie, 4th Ed., 1923, vol. 6, p. 44.
Ritter et al., J. Am. Chem. Soc. 58, 291–3 (1936).
Byers, Jr., Synthetic Organic Chemicals, 19, No. 4, p. 1–2 (1947). (Published by Eastman Kodak Co., Rochester, N.Y.)
English, Jr. et al., J. Am. Chem. Soc. 74, 1909–12 (1952).